US012715510B2

(12) United States Patent
Murai et al.

(10) Patent No.: US 12,715,510 B2
(45) Date of Patent: Aug. 25, 2026

(54) VEHICLE CONTROL METHOD AND VEHICLE CONTROL DEVICE FOR LIMITING STEERING ROTATION ANGLE DURING TEACHING TRAVELING PARKING OPERATION

(71) Applicant: Panasonic Automotive Systems Co., Ltd., Kanagawa (JP)

(72) Inventors: Akihito Murai, Kanagawa Ken (JP); Hirofumi Nishimura, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 38 days.

(21) Appl. No.: 19/021,534

(22) Filed: Jan. 15, 2025

(65) Prior Publication Data

US 2025/0304168 A1 Oct. 2, 2025

(30) Foreign Application Priority Data

Mar. 26, 2024 (JP) ................................ 2024-048976

(51) Int. Cl.
*B62D 15/02* (2006.01)
*B60W 10/20* (2006.01)
(Continued)

(52) U.S. Cl.
CPC ......... *B62D 15/0285* (2013.01); *B60W 10/20* (2013.01); *B60W 30/06* (2013.01);
(Continued)

(58) Field of Classification Search
CPC ... B62D 15/0285; B60W 10/20; B60W 30/06; B60W 50/14; B60W 60/001;
(Continued)

(56) References Cited

U.S. PATENT DOCUMENTS

2018/0079442 A1* 3/2018 Lubischer .............. B62D 1/183
2018/0105208 A1* 4/2018 Kim .................. B62D 15/0285
(Continued)

FOREIGN PATENT DOCUMENTS

JP 2018-124920 A 8/2018
JP 2023-175343 A 12/2023
WO 2019/058781 A1 3/2019

*Primary Examiner* — James J Lee
*Assistant Examiner* — Jonathan E Reinert
(74) *Attorney, Agent, or Firm* — Greenbium & Bernstein, P.L.C.

(57) ABSTRACT

A vehicle control method is executed by a control device of a vehicle. According to the method, a taught path is registered based on an outside situation of the vehicle during teaching traveling in which the vehicle travels from a predetermined position to a target parking position. The vehicle is caused to perform autonomous traveling from the predetermined position to the target parking position. When a speed of the vehicle becomes a first speed or lower during the teaching traveling, a resistance force is applied to a steering wheel rotation operation, and a display device of the vehicle is caused to display a first indicator showing a request for suppression of the steering wheel rotation operation. When the speed of the vehicle becomes a second speed or lower during the autonomous traveling, the vehicle is caused to perform steering at a predetermined angle or greater.

20 Claims, 6 Drawing Sheets

(51) Int. Cl.
*B60W 30/06* (2006.01)
*B60W 50/14* (2020.01)
*B60W 60/00* (2020.01)

(52) U.S. Cl.
CPC .......... *B60W 50/14* (2013.01); *B60W 60/001* (2020.02); *B60W 2520/10* (2013.01); *B60W 2540/18* (2013.01); *B60W 2710/20* (2013.01)

(58) Field of Classification Search
CPC ......... B60W 2520/10; B60W 2540/18; B60W 2710/20; B60W 2050/146
See application file for complete search history.

(56) References Cited

U.S. PATENT DOCUMENTS

| | | | | |
|---|---|---|---|---|
| 2018/0362043 | A1* | 12/2018 | Hwang | B60W 50/12 |
| 2023/0100856 | A1* | 3/2023 | Imazu | B60W 50/14<br>340/932.2 |
| 2024/0239381 | A1* | 7/2024 | Iwaki | B60W 60/0053 |
| 2024/0300578 | A1* | 9/2024 | Liu | B62D 5/046 |

* cited by examiner

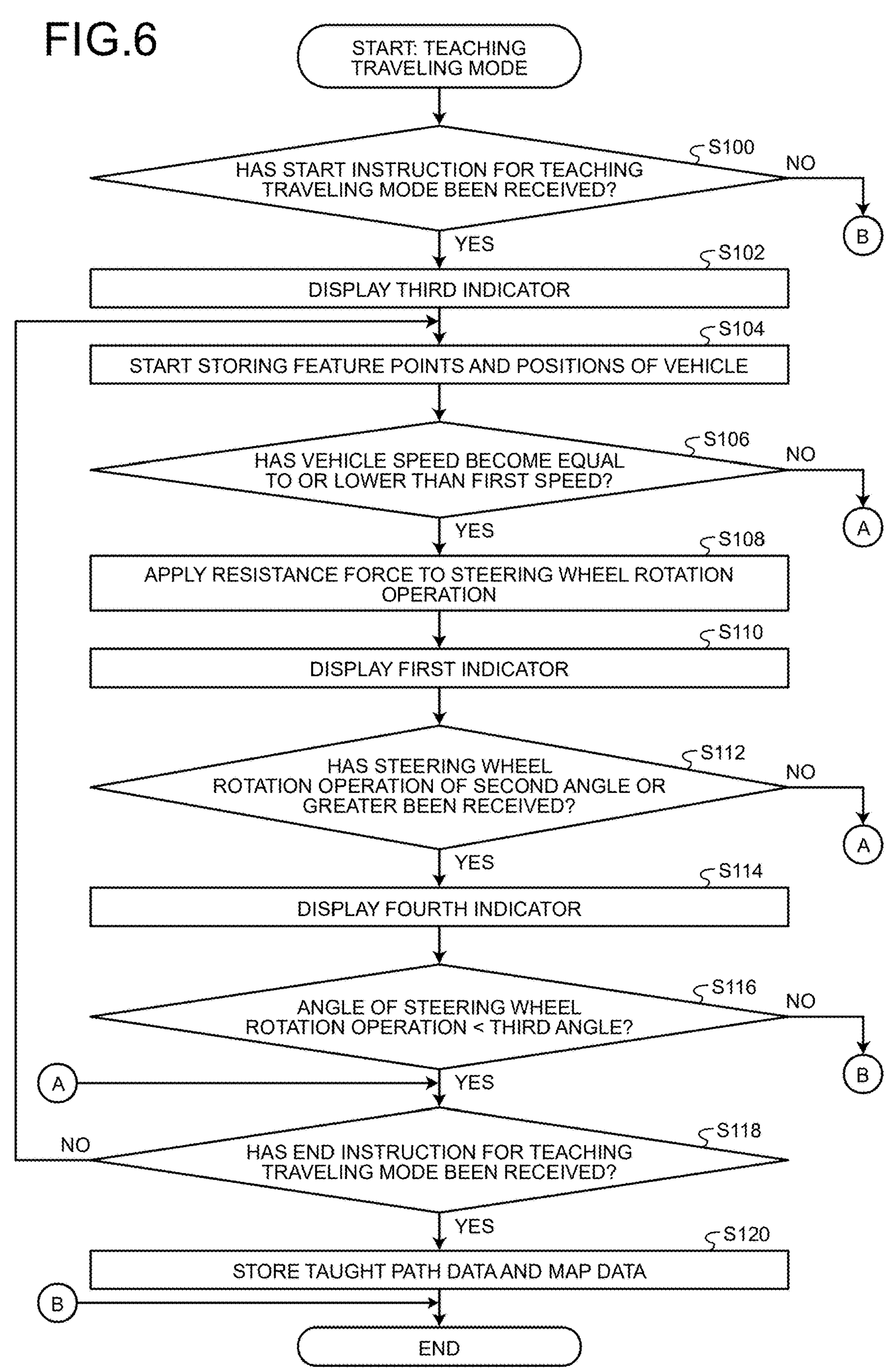
FIG.6
START: TEACHING TRAVELING MODE
HAS START INSTRUCTION FOR TEACHING TRAVELING MODE BEEN RECEIVED?
S100
NO
B
YES
DISPLAY THIRD INDICATOR
S102
START STORING FEATURE POINTS AND POSITIONS OF VEHICLE
S104
HAS VEHICLE SPEED BECOME EQUAL TO OR LOWER THAN FIRST SPEED?
S106
NO
A
YES
APPLY RESISTANCE FORCE TO STEERING WHEEL ROTATION OPERATION
S108
DISPLAY FIRST INDICATOR
S110
HAS STEERING WHEEL ROTATION OPERATION OF SECOND ANGLE OR GREATER BEEN RECEIVED?
S112
NO
A
YES
DISPLAY FOURTH INDICATOR
S114
ANGLE OF STEERING WHEEL ROTATION OPERATION < THIRD ANGLE?
S116
NO
B
A
YES
HAS END INSTRUCTION FOR TEACHING TRAVELING MODE BEEN RECEIVED?
S118
NO
YES
STORE TAUGHT PATH DATA AND MAP DATA
S120
B
END

VEHICLE CONTROL METHOD AND VEHICLE CONTROL DEVICE FOR LIMITING STEERING ROTATION ANGLE DURING TEACHING TRAVELING PARKING OPERATION

CROSS-REFERENCE TO RELATED APPLICATIONS

This application is based upon and claims the benefit of priority from Japanese Patent Application No. 2024-048976, filed on Mar. 26, 2024, the entire contents of which are incorporated herein by reference.

FIELD

Embodiments described herein relate generally to a vehicle control method and a vehicle control device.

BACKGROUND

In general, a parking space in a house is often narrow, making parking difficult. Therefore, there is a high need to perform parking and exiting by automated driving.

A vehicle control device that implements such a type of automated driving has been known. For example, a technology has been disclosed (for example, a patent literature JP 2023-175343 A), in which a vehicle is caused to perform teaching traveling from a predetermined position to a target parking position by a manual operation by a driver. Data of a traveling route obtained by the teaching traveling is stored as a taught path, and, when performing parking thereafter, the vehicle is caused to perform autonomous traveling along the stored taught path.

However, if the stored taught path is a path obtained by a steering wheel rotation operation that was performed at a predetermined rotation angle or greater by the manual operation of the driver during the teaching traveling, it may be difficult to perform following traveling along the taught path during the autonomous traveling.

In the related art, it may be difficult to provide preferable parking assistance.

Therefore, there is a need to provide preferable parking assistance.

SUMMARY

A vehicle control method according to one aspect of the present disclosure is executed by a vehicle control device provided in a vehicle. The vehicle includes an operation device serving to receive an operation of a passenger, a sensor device serving to acquire an outside situation, a display device being visually recognizable by the passenger, and a movement control device serving to control at least steering. The vehicle control method includes registering a taught path based on an outside situation acquired by the sensor device during teaching traveling in which the vehicle travels from a predetermined position to a target parking position by the operation of the passenger. The vehicle control method includes causing, based on the outside situation acquired by the sensor device and the taught path, the vehicle to perform autonomous traveling from the predetermined position to the target parking position by controlling at least the steering. The vehicle control method includes, when a speed of the vehicle has become equal to or lower than a first speed during the teaching traveling, applying a resistance force to a steering wheel rotation operation of the operation device by the passenger and causing the display device to display a first indicator showing a request for suppression of the steering wheel rotation operation. The vehicle control method includes, when the speed of the vehicle has become equal to or lower than a second speed during the autonomous traveling, causing the movement control device to perform steering at a predetermined angle or greater.

BRIEF DESCRIPTION OF THE DRAWINGS

FIG. 6 is a flowchart illustrating an example of a procedure of information processing executed by a control unit in a teaching traveling mode;

DETAILED DESCRIPTION

Hereinafter, embodiments of a vehicle control method and a vehicle control device according to the present disclosure will be described with reference to the drawings.

Figure 1:
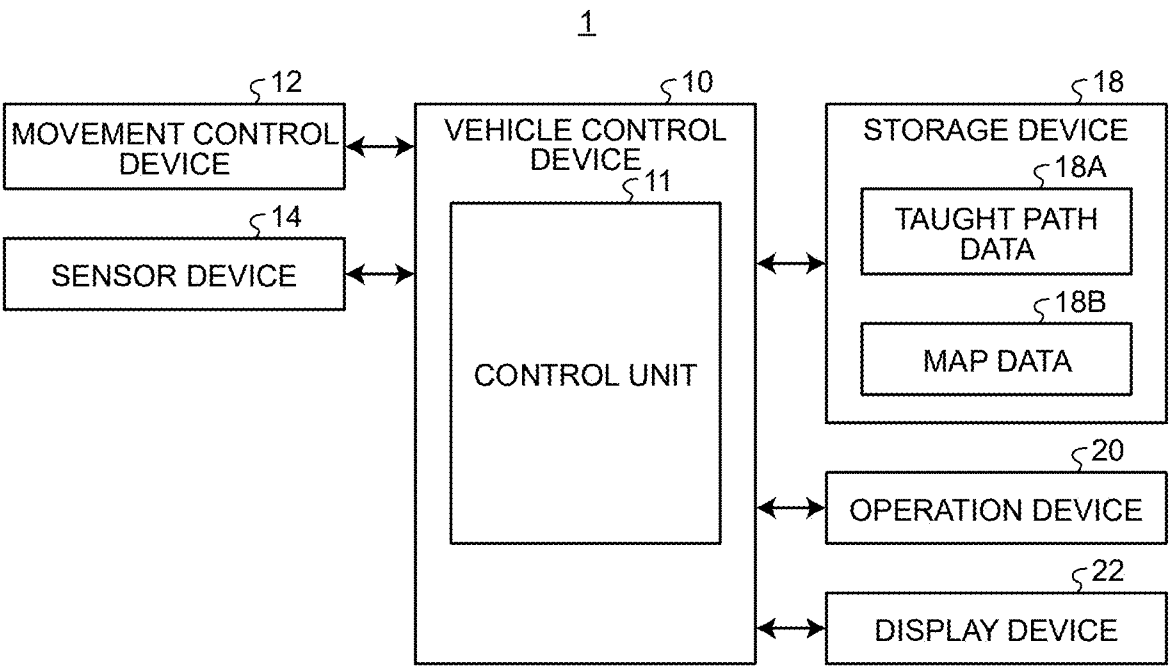
FIG. 1 is a block diagram illustrating an example of an overall configuration of a vehicle.

FIG. 1 is a block diagram illustrating an example of an overall configuration of a vehicle 1.

The vehicle 1 includes a vehicle control device 10, a movement control device 12, a sensor device 14, a storage device 18, an operation device 20, and a display device 22.

The movement control device 12, the sensor device 14, the storage device 18, the operation device 20, and the display device 22 are connected to the vehicle control device 10 so as to be able to exchange data or a signal. Thus, the vehicle control device 10 is communicably connected to at least the sensor device 14, the operation device 20, the display device 22, and the movement control device 12.

The movement control device 12 controls at least the steering of the vehicle 1. The movement control device 12 is means for implementing driving, braking, and turning motions necessary for traveling of the vehicle 1. The movement control device 12 includes, for example, a drive motor, a power transmission mechanism, a brake device, a steering device, and the like, and an electronic vehicle control device that controls the drive motor, the power transmission mechanism, the brake device, the steering device, and the like. The movement control device 12 causes the vehicle 1 to travel by, for example, generating power with the drive motor and transmitting the power to wheels via the power transmission mechanism. The power transmission mechanism is, for example, a propeller shaft, a differential gear, a drive shaft, or the like. Controlling at least the steering means that the movement control device 12 controls at least one of the driving, braking, and turning motions necessary for the traveling of the vehicle 1. Thus, controlling the steering means that the movement control device 12 controls at least one of a turning direction by steering, a vehicle speed or acceleration by accelerator steering, and deceleration or stop by brake steering.

The sensor device 14 is provided in the vehicle 1 to acquire at least an outside situation of the vehicle 1. Specifically, the sensor device 14 includes various sensors serving to detect a traveling state of the vehicle 1 and detect the outside situation of the vehicle 1.

The sensor device 14 includes at least a camera. The sensor device 14 further includes a light detection and ranging (LiDAR), a radar, an ultrasonic sensor, or the like. In addition, the sensor device 14 includes an accelerator pedal position sensor serving to detect an accelerator pedal position, a steering angle sensor serving to detect a steering angle of the steering device, a steering wheel rotation operation angle detection sensor serving to detect an angle of a steering wheel rotation operation of a steering wheel, an acceleration sensor serving to detect an acceleration acting in a front-rear direction of the vehicle 1, a torque sensor serving to detect a torque acting on the power transmission mechanism between the wheels of the vehicle 1 and the drive motor, a vehicle speed sensor serving to detect the vehicle speed of the vehicle 1, a wheel speed sensor, and the like. The sensor device 14 outputs, to the vehicle control device 10, sensor information obtained by the detection.

The camera is a surrounding sensor that is provided in the vehicle 1 to monitor a surrounding environment of the vehicle 1. In the present embodiment, the camera captures the surroundings of the vehicle 1 and outputs captured video data to the vehicle control device 10. Hereinafter, the captured video data may be simply referred to as a captured video. In the present embodiment, the camera is also used for detecting an object present around the vehicle 1 and estimating a position of the vehicle 1 based on a positional relationship between the vehicle 1 and the object present around the vehicle 1.

A position of the camera, the number of installed cameras, and a capturing direction of the camera are adjusted in advance so as to capture the surroundings of the vehicle 1. In one example, four cameras arranged so as to be able to capture four directions of a front direction, a rear direction, a left direction, and a right direction of the vehicle 1 are provided in the vehicle 1. The number of cameras provided in the vehicle 1 is not limited to four.

The storage device 18 stores various data. In the present embodiment, the storage device 18 stores data such as taught path data 18A and map data 18B. Details of the taught path data 18A and the map data 18B are described later. The storage device 18 is, for example, an auxiliary storage device such as a hard disk drive (HDD), a solid state drive (SSD), or a flash memory. At least part of the data included in the storage device 18 may be stored in an external storage device such as a server device provided outside the vehicle 1 and communicably connected to the vehicle control device 10.

The operation device 20 receives an operation by a passenger of the vehicle 1. The operation device 20 includes a steering device such as the steering wheel, an operation mechanism related to a driving operation such as an accelerator pedal, a brake pedal, a turn signal lever, and a push-button switch, and an input device such as a keyboard, a touch panel, or a switch. The operation device 20 may serve as part of a human machine interface (HMI).

The display device 22 is a display that outputs various images. The display device 22 is installed at a position visually recognizable by the passenger of the vehicle 1. Examples of the display include a liquid crystal display (LCD), an organic electro-luminescence (EL) display, and a projector. The display may also be a touch panel display in which the display device 22 and the operation device 20 are integrally configured. The display device 22 is an example of the HMI.

The vehicle control device 10 is an electronic control unit that integrally controls the respective units of the vehicle 1.

The vehicle control device 10 control the movement control device 12 such that the traveling state of the vehicle 1 is optimized by using the sensor information received from the sensor device 14. In addition, the vehicle control device 10 controls the movement control device 12 to cause the vehicle 1 to perform the autonomous traveling.

The vehicle control device 10 includes a control unit 11. Part of or the entire control unit 11 may have a software configuration implemented by cooperation of a processor and various programs stored in a memory. In addition, part of or the entire control unit 11 may have a hardware configuration implemented by a dedicated circuit or the like.

The control unit 11 integrally controls the respective units of the vehicle 1.

In the present embodiment, the control unit 11 is configured to be able to switch a traveling mode to a teaching traveling mode or an autonomous traveling mode based on an input operation or the like of the operation device 20 by the passenger. The traveling mode executable by the vehicle 1 may include various traveling modes other than the teaching traveling mode and the autonomous traveling mode.

The teaching traveling mode refers to a mode for registering a taught path when causing the vehicle 1 to perform autonomous traveling. The taught path is a route obtained by performing teaching traveling from a predetermined position to a target parking position. In the teaching traveling mode, the vehicle 1 is controlled to travel by an operation of the passenger. In the teaching traveling mode, the control unit 11 controls the movement control device 12 to travel according to a manual operation which is the driving operation by the passenger. In other words, in the teaching traveling mode, the control unit 11 registers the taught path based on the outside situation acquired by the sensor device 14 during the teaching traveling in which the vehicle 1 travels from the predetermined position to the target parking position by the operation of the passenger.

The autonomous traveling mode is a mode in which the vehicle 1 performs the autonomous traveling. In the present embodiment, the autonomous traveling mode means a mode in which the vehicle 1 performs the autonomous traveling along the taught path. In the autonomous traveling mode, the control unit 11 controls the movement control device 12 to travel along the taught path by controlling at least the steering. In the autonomous traveling mode, the vehicle 1 is automatically controlled to travel by the vehicle control device 10 without the manual operation by the passenger. In the autonomous traveling mode, the control unit 11 causes the vehicle 1 to perform the autonomous traveling by controlling at least the steering from the predetermined position to the target parking position based on the outside situation acquired by the sensor device 14 based on the taught path.

Figure 2:
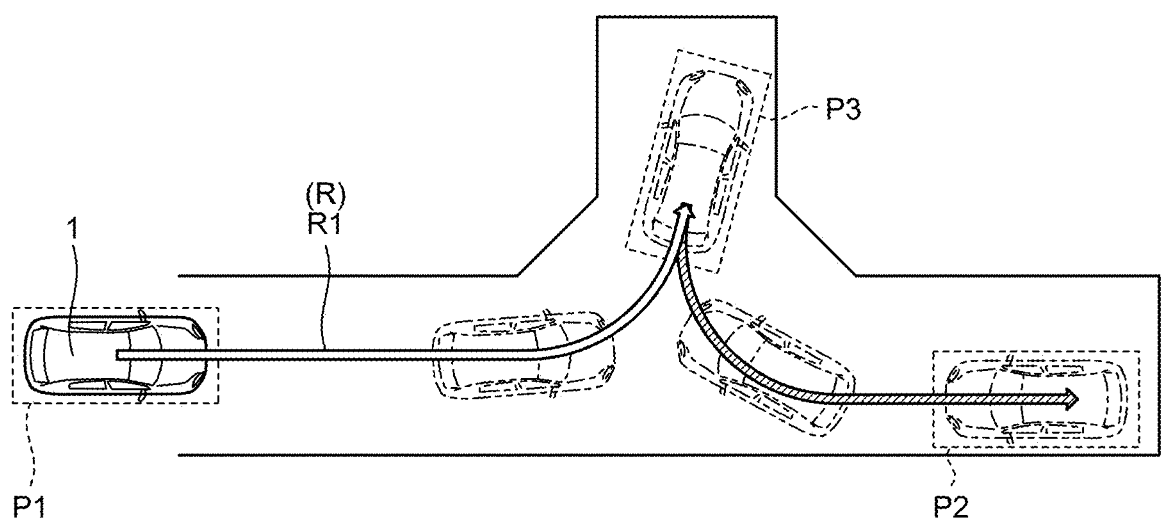
FIG. 2 is an explanatory diagram of an example of a taught path.

FIG. 2 is an explanatory diagram of an example of a taught path R1.

In the teaching traveling mode, the teaching traveling from a predetermined position P1 to a target parking position P2 is performed by the manual operation by the passenger. The target parking position P2 is, for example, a parking lot or the like, but is not limited thereto. Further, it is sufficient if the predetermined position P1 is any position of the passenger in a real space.

A traveling route R on which the teaching traveling has been performed is treated as the taught path R1, and the taught path data 18A of the taught path R1 is stored in the storage device 18. During the teaching traveling, the passenger performs the manual operation such that traveling from the target parking position P2 toward the predetermined position P1 is performed. In a case where the vehicle 1 travels from the predetermined position P1 toward the target parking position P2 during the teaching traveling, the control unit 11 creates the taught path data 18A of the taught path R1 along a traveling direction of the traveling route R during the teaching traveling. In the present embodiment, a description will be given on the assumption that the traveling route R during the teaching traveling is a route on which the vehicle 1 travels from the predetermined position P1 toward a turning point P3 and reaches the target parking position P2 after the vehicle 1 is turned back at the turning point P3. The turning back of the vehicle 1 means changing an orientation or direction of the vehicle 1. Details of the creation of the taught path data 18A are described later.

In the autonomous traveling mode, the control unit 11 controls at least the steering along the taught path R1 obtained by the teaching traveling to cause the vehicle 1 to perform the autonomous traveling to the target parking position P2. In the autonomous traveling mode, the control unit 11 performs steering control and front and rear acceleration/deceleration control of the vehicle 1, and at least part of the front and rear acceleration/deceleration control may be performed by an operation of a driver.

Next, control by the control unit 11 in each of the teaching traveling mode and the autonomous traveling mode will be described in detail.

Teaching Traveling Mode

First, the control of the control unit 11 in the teaching traveling mode will be described in detail.

The control unit 11 switches the traveling mode to the teaching traveling mode when a signal indicating a start instruction for the teaching traveling mode is received by an operation of the operation device 20 by the passenger. Then, the control unit 11 executes the following processing in the teaching traveling mode.

The control unit 11 acquires the sensor information indicating the traveling state of the vehicle 1 from the sensor device 14. Then, the control unit 11 estimates a current position of the vehicle 1 based on a temporal change of a sensor value indicated by the sensor information. In one example, the control unit 11 calculates a movement amount of the vehicle 1 from a reference position such as a traveling start position when the teaching traveling mode is started based on a temporal change of the vehicle speed and a yaw rate represented by the sensor values, and estimates the current position of the vehicle 1 based on the movement amount.

Accuracy in estimation of the current position based on the movement amount may be low. Therefore, the control unit 11 may use, as the current position, a result of correcting the estimated current position based on the captured video of the surroundings of the vehicle 1 acquired by the camera.

The control unit 11 sequentially stores, in the storage device 18, the current positions of the vehicle 1 sequentially estimated during the traveling of the vehicle 1. Specifically, the control unit 11 sets, as the taught path R1, the traveling route R during the teaching traveling represented by a group of the current positions sequentially estimated from a time point when the start instruction for the teaching traveling mode is received to a time point when an end instruction for the teaching traveling mode is received, and stores the taught path data 18A representing the taught path R1 in the storage device 18.

The taught path data 18A includes a group of pieces of traveling information for each of the current positions that are sequentially estimated during the teaching traveling. The traveling information includes an INDEX, a traveling position, an azimuth, a traveling direction, and reference traveling information. The INDEX is identification information of the traveling information. The traveling position is an estimated position of the vehicle 1. The azimuth indicates the orientation of the vehicle 1 at the position. The traveling direction indicates the traveling direction of the vehicle 1 at the position, and is represented by, for example, forward or backward. The reference traveling information is information indicating the traveling state or the like at the position. The reference traveling information is, for example, information such as the steering angle and the vehicle speed detected at each position during the teaching traveling.

In addition, the control unit 11 creates the map data 18B for estimating the current position of the vehicle 1 from the captured video captured by the camera during the teaching traveling of the vehicle 1. As a method for estimating the current position of the vehicle 1 from the captured video, a simultaneous localization and mapping (SLAM) method or the like is used.

The map data 18B is map data in which feature points around the vehicle 1 during the traveling along the taught path R1 are registered.

The feature point is a characteristic point obtained by performing image analysis on the captured video captured by the camera during the teaching traveling. The feature point is, for example, a point where a characteristic image pattern can be obtained by analyzing the captured video in an object (a tree, a wall, a column, etc.) or the like that can be a mark in a real view. The point may be an edge of the object. The map data 18B includes the feature points, and each feature point is identifiably registered for each feature point by being assigned an identification number.

The feature point is represented by feature point data including a three-dimensional position and a feature amount. The three-dimensional position of the feature point is the three-dimensional position of the feature point in the real space, and is represented by, for example, a three-dimensional orthogonal coordinate system (X, Y, Z). The feature amount of the feature point is a characteristic amount represented by the image analysis of the captured video of the feature point. The feature amount of the feature point is, for example, a luminance and a density on the captured video, a scale invariant feature transform (SIFT) feature amount, a speeded up robust features (SURF) feature amount, or the like.

In the map data 18B, one feature point is registered for each identical three-dimensional position. For the identical three-dimensional position, plural feature points may be registered in the map data 18B for each capturing position and capturing direction of the camera at the three-dimensional position. In addition, the feature point data of the feature point registered in the map data 18B may further include image data of the object having the feature point.

During the teaching traveling, the control unit 11 determines coordinates of the feature point in the real view based on stereo photogrammetry or the like. Specifically, the control unit 11 reads videos captured at different timings, and correlates the same feature points with one another, which commonly appear in the captured videos. The control unit 11 estimates a temporary position of the vehicle 1 where the videos are captured, and determines temporary coordinates of the feature point in the real view by using a principle of triangulation. Then, the control unit 11 performs bundle adjustment by using the temporary position of the vehicle 1 and the temporary coordinates of the feature point in the real view as reference information, and calculates a formal position of the vehicle 1 and formal coordinates of the feature point in the real view so as to minimize a reprojection error to be caused when each feature point in the real view is projected on all the captured videos. The control unit 11 stores, in the storage device 18, the map data 18B in which the feature point represented by the feature point data including the formal coordinates of the feature point in the real view as the three-dimensional position is registered.

The three-dimensional position of the feature point registered in the map data 18B may be a position measured in advance using the LiDAR or a stereo camera without using the SLAM method. However, from the viewpoint of suppressing a decrease in position estimation accuracy, it is preferable to use the SLAM method.

As described above, the control unit 11 executes the above-described processing in the teaching traveling mode. Therefore, in the teaching traveling mode, the control unit 11 generates the taught path data 18A of the taught path R1 obtained by the teaching traveling from the predetermined position P1 to the target parking position P2 and the map data 18B in which the three-dimensional position of each of the feature points around the vehicle 1 during the traveling along the taught path R1 and the feature amount of the feature point are registered, and stores the generated taught path data 18A and map data 18B in the storage device 18.

Autonomous Traveling Mode

Next, the control of the control unit 11 in the autonomous traveling mode will be described in detail.

The control unit 11 switches the traveling mode to the autonomous traveling mode when a signal indicating a start instruction for the autonomous traveling mode is received by the operation of the operation device 20 by the passenger. Then, the control unit 11 executes the following processing in the autonomous traveling mode.

The control unit 11 reads the taught path data 18A and the map data 18B from the storage device 18, and controls the movement control device 12 to perform the autonomous traveling along the taught path R1 represented by the taught path data 18A.

The control unit 11 estimates the current position of the vehicle 1 based on the map data 18B and the captured video of the surroundings of the vehicle 1 acquired by at least one camera.

The control unit 11 collates a characteristic point extracted from the captured video of the camera with the feature point stored in the map data 18B by using pattern matching, feature amount search, or the like. Then, the control unit 11 randomly selects several (for example, in a range of three to six) characteristic points among the characteristic points that are extracted from the captured video of the camera and collated with the feature points stored in the map data 18B.

Then, the control unit 11 estimates the current position of the vehicle 1 in the real space based on positions of the several characteristic points in the captured video and the three-dimensional positions of the feature points registered in the map data 18B corresponding to the several characteristic points in the real space. At this time, the control unit 11 estimates the current position of the vehicle 1 by solving a PnP problem by using a known method such as Lambda Twist (for example, Literature: Mikael Persson et al. "Lambda Twist: An Accurate Fast Robust Perspective Three Point (P3P) Solver", ECCV 2018, pp 334-349, published in 2018, http://openaccess.thecvf.com/content_ECCV_2018/papers/Mikael_Persson_Lambda_Twist_An_ECCV_2018_paper.pdf).

When collating the characteristic points extracted from the captured video of the camera with the feature points stored in the map data 18B, the control unit 11 may calculate the current position of the vehicle 1 as the temporary position based on the movement amount of the vehicle 1 described above, and may narrow down the feature points to be collated with the characteristic points extracted from the captured video of the camera among the feature points stored in the map data 18B with the temporary position as a reference.

Through the above-described processing, the control unit 11 estimates, as current position information indicating the current position of the vehicle 1, current position information including information regarding a two-dimensional position (X coordinate, Y coordinate) of the vehicle 1 in the real space and a posture which is the orientation of the vehicle 1, based on the map data 18B and the captured video of the surroundings of the vehicle 1 acquired by at least one camera.

Then, the control unit 11 causes the vehicle 1 to perform the autonomous traveling from the predetermined position P1 toward the target parking position P2 along the taught path R1 by controlling the movement control device 12 such that the estimated current position of the vehicle 1 is a position on the taught path R1 represented by the taught path data 18A. Then, the control unit 11 stops the vehicle 1 at the target parking position P2.

During the autonomous traveling of the vehicle 1 along the taught path R1, the control unit 11 feedback-controls the movement control device 12 such that the vehicle 1 moves along the taught path R1 based on the estimated current position of the vehicle 1 and each position on the taught path R1 represented by the taught path data 18A.

Here, there is a case where the traveling route R on which the steering wheel rotation operation of a predetermined rotation angle or greater is performed by the manual operation by the passenger during the teaching traveling is registered as the taught path R1. In such a case, it may be difficult to perform following traveling along the taught path R1 during the autonomous traveling. In one example, it may be difficult to perform the autonomous traveling at the same steering angle as that during the teaching traveling due to restriction of electric power steering or the like.

Therefore, in the present embodiment, the control unit 11 further executes the following processing in the teaching traveling mode.

In a case where the vehicle 1 is at the predetermined position P1 in the teaching traveling, the control unit 11 causes the display device 22 to display a third indicator.

The third indicator is an indicator showing a request to refrain from a stationary steering operation. The request to refrain from the stationary steering operation refers to a request for suppression or prohibition of the stationary steering operation that is the steering wheel rotation operation performed in a state where the vehicle 1 is stopped.

When the start instruction for the teaching traveling mode is received by the operation of the operation device 20 by the passenger, the control unit 11 determines a point where the start instruction has been received as the predetermined position P1. Then, in a case where the vehicle 1 is at the predetermined position P1, the control unit 11 causes the display device 22 to display the third indicator.

Figure 3:
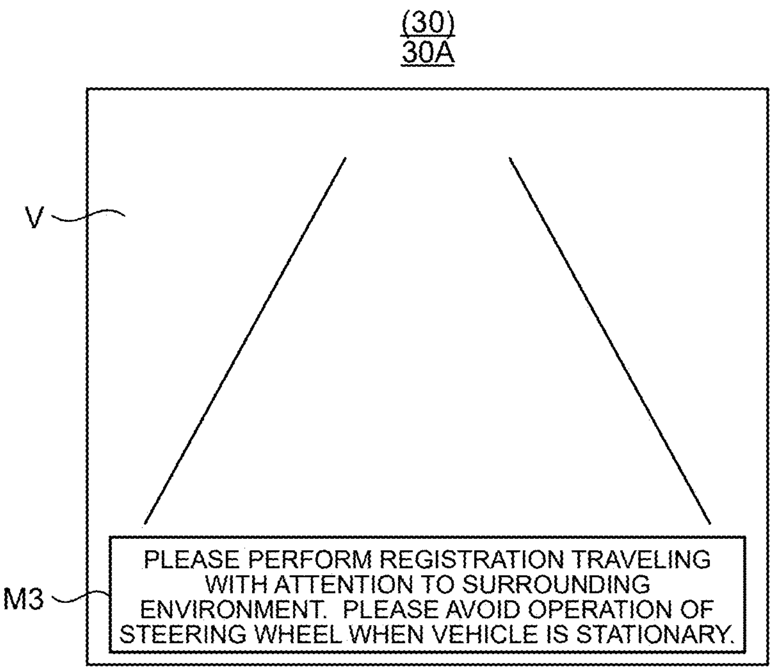
FIG. 3 is a schematic view of an example of a third indicator screen.

FIG. 3 is a schematic view of an example of a third indicator screen 30A. The third indicator screen 30A is an example of a screen 30 displayed on the display device 22 of the vehicle 1. FIG. 3 illustrates, as an example, the third indicator screen 30A on which the third indicator M3 is superimposed on a captured video V.

In a case where the vehicle 1 is at the predetermined position P1 in the teaching traveling, the control unit 11 displays the third indicator screen 30A on the display device 22. Specifically, when the captured video V has been displayed on the screen 30, the control unit 11 controls the display device 22 to superimpose and display the third indicator M3 on the captured video V. In the example illustrated in FIG. 3, the third indicator M3 shows a phrase requesting the passenger to refrain from the stationary steering operation. The third indicator M3 may be a still image, an animation image, an icon, or the like that requests to refrain from the stationary steering operation, and is not limited to the phrase.

The control unit 11 causes the display device 22 to display the third indicator. With this configuration, it is possible to urge the passenger operating the steering wheel to suppress the stationary steering operation during the teaching traveling when the vehicle 1 is at the predetermined position P1 in the teaching traveling.

Returning to FIG. 2, the description continues.

In a case where: the teaching traveling is started by the manual operation by the passenger, the movement from the predetermined position P1 is started, and the vehicle speed of the vehicle 1 has become equal to or lower than a first speed, the control unit 11 applies a resistance force to the steering wheel rotation operation of the operation device 20 by the passenger and causes the display device 22 to display a first indicator.

The control unit 11 acquires the vehicle speed of the vehicle 1 included in the sensor information received from the sensor device 14. Then, the control unit 11 determines whether or not the acquired vehicle speed of the vehicle 1 has become equal to or lower than the first speed. The vehicle speed becoming equal to or lower than the first speed means that the vehicle 1 has decelerated from a vehicle speed exceeding the first speed to a vehicle speed equal to or lower than the first speed.

The first speed is a predetermined speed, and it is sufficient if the first speed is stored in the storage device 18 in advance. As the first speed, it is sufficient if a speed equal to or lower than a general speed of the vehicle 1 at the time of approaching the vicinity of the turning point P3 or at the time of reaching the turning point P3 is determined in advance. The first speed is specifically a speed including 0 (zero), and may include a speed at which the vehicle 1 slightly travels. The speed at which the vehicle 1 slightly travels is a speed (for example, 6 km/h) at the time of a creep phenomenon, but is not limited to this speed. Moreover, the first speed stored in the storage device 18 may be changeable as appropriate according to an operation instruction or the like for the operation device 20 from the passenger or the like.

In a case where the vehicle speed of the vehicle 1 has become equal to or lower than the first speed during the teaching traveling, the control unit 11 applies the resistance force to the steering wheel rotation operation of the operation device 20 by the passenger. In one example, the control unit 11 applies the resistance force (reaction force) to the steering wheel included in the operation device 20 by a known technology to apply the resistance force to the steering wheel rotation operation.

When the control unit 11 applies the resistance force to the steering wheel rotation operation, the control unit 11 can urge the passenger operating the steering wheel to suppress the steering wheel rotation operation in a case where the vehicle speed of the vehicle 1 has become equal to or lower than the first speed during the teaching traveling.

In addition, the control unit 11 causes the display device 22 to display the first indicator in a case where the vehicle speed of the vehicle 1 has become equal to or lower than the first speed during the teaching traveling.

The first indicator is an indicator showing a request that the passenger suppresses the steering wheel rotation operation. The first indicator may include a second indicator showing prohibition of the steering wheel rotation operation.

Figure 4:
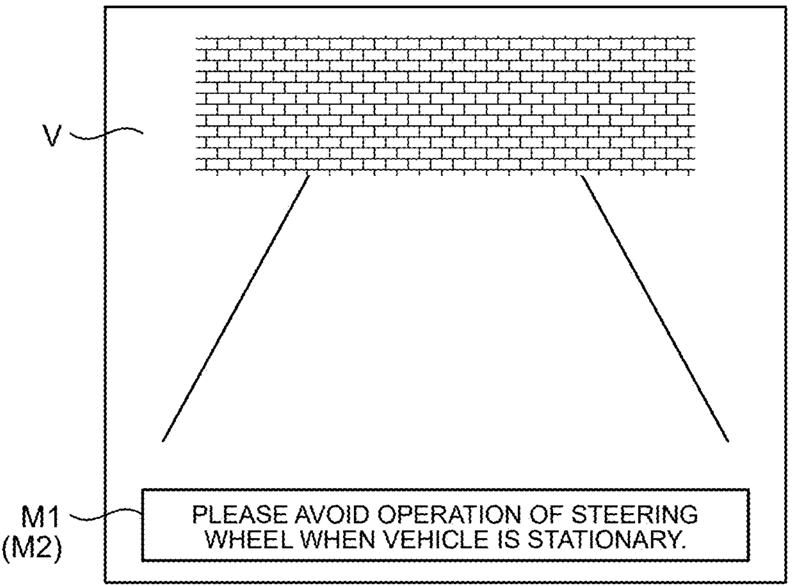
FIG. 4 is a schematic view of an example of a first indicator screen.

FIG. 4 is a schematic view of an example of a first indicator screen 30B. The first indicator screen 30B is an example of the screen 30 displayed on the display device 22 of the vehicle 1. FIG. 4 illustrates, as an example, the first indicator screen 30B on which a first indicator M1 is superimposed on the captured video V.

In a case where the vehicle speed of the vehicle 1 has become equal to or lower than the first speed during the teaching traveling, the control unit 11 causes the display device 22 to display the first indicator screen 30B. Specifically, in a case where the captured video V is displayed on the screen 30, the control unit 11 controls the display device 22 to superimpose and display the first indicator M1 on the captured video V. FIG. 4 illustrates, as an example, a form in which the first indicator M1 is a phrase requesting the passenger to suppress the steering wheel rotation operation. The first indicator M1 is not limited to the phrase, and may be expressed by a still image, an animation image, an icon, or the like to request the passenger to suppress the steering wheel rotation operation. As described above, the first indicator M1 may include a second indicator M2 that is expressed by a phrase, a still image, an animation image, an icon, or the like to request the passenger to prohibit the steering wheel rotation operation.

In a case where the vehicle speed of the vehicle 1 has become equal to or lower than the first speed during the teaching traveling, the control unit 11 causes the display device 22 to display the first indicator M1, so that it is possible to urge the passenger operating the steering wheel to suppress the steering wheel rotation operation when the vehicle speed of the vehicle 1 has become equal to or lower than the first speed during the teaching traveling.

Returning to FIG. 2, the description continues.

After causing the display device 22 to display the first indicator M1, the control unit 11 determines whether or not the steering wheel rotation operation of a second angle or greater for the steering wheel included in the operation device 20 by the passenger has been received while the speed of the vehicle 1 is equal to or lower than the first speed.

The second angle is an angle smaller than a first angle described later and is an angle smaller than a third angle described later. The second angle is, for example, 90 degrees in the steering wheel rotation operation, but is not limited to this angle.

The control unit 11 performs the determination by determining whether or not the angle of the steering wheel rotation operation detected by the steering wheel rotation operation angle detection sensor, included in the sensor information detected by the sensor device 14 is the second angle or greater. In addition, the control unit 11 may perform the determination by determining whether or not a rotation angle of the steering wheel provided in the vehicle 1 corresponding to the steering angle detected by the steering angle sensor serving to detect the steering angle of the steering device included in the sensor information is equal to or greater than the second angle.

In response to determining that the steering wheel rotation operation of the second angle or greater has been received while the speed of the vehicle 1 is equal to or lower than the first speed, the control unit 11 causes the display device 22 to display a fourth indicator.

The fourth indicator is an indicator showing that there is a possibility that the taught path R1 cannot be registered.

Figure 5:
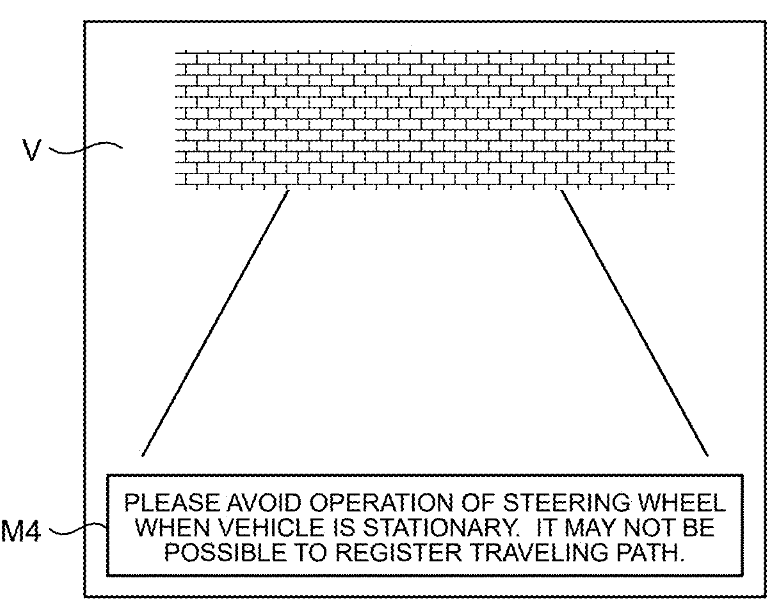
FIG. 5 is a schematic view of an example of a fourth indicator screen.

FIG. 5 is a schematic view of an example of a fourth indicator screen 30C. The fourth indicator screen 30C is an example of the screen 30 displayed on the display device 22 of the vehicle 1. FIG. 5 illustrates, as an example, the fourth indicator screen 30C on which the fourth indicator M4 is superimposed on the captured video V.

In a case where the steering wheel rotation operation of the second angle or greater has been received while the vehicle speed of the vehicle 1 is equal to or lower than the first speed after causing the display device 22 to display the first indicator M1, the control unit 11 causes the display device 22 to display the fourth indicator M4. Specifically, in a case where the captured video V is displayed on the screen 30, the control unit 11 controls the display device 22 to superimpose and display the fourth indicator M4 on the captured video V. FIG. 5 illustrates, as an example, a form in which the fourth indicator M4 is a phrase indicating that there is a possibility that the taught path R1 cannot be registered. The fourth indicator M4 may be a still image, an animation image, an icon, or the like indicating that there is a possibility that the taught path R1 cannot be registered, and is not limited to the phrase.

As described above, in a case where the steering wheel rotation operation of the second angle or greater by the passenger has been received while the vehicle speed of the vehicle 1 is equal to or lower than the first speed after causing the display device 22 to display the first indicator M1 during the teaching traveling, the control unit 11 causes the display device 22 to display the fourth indicator M4. As a result, the control unit 11 can more strongly urge the passenger who has performed the steering wheel rotation operation of the second angle or greater when the vehicle speed of the vehicle 1 is equal to or lower than the first speed during the teaching traveling to suppress the steering wheel rotation operation than when displaying the first indicator M1.

Returning to FIG. 2, the description continues.

The control unit 11 registers the traveling route R as the taught path R1 in a case where the angle of the steering wheel rotation operation of the operation device 20 by the passenger is smaller than the third angle while the vehicle speed of the vehicle 1 is equal to or lower than the first speed. On the other hand, the control unit 11 does not register the traveling route R as the taught path R1 in a case where the angle of the steering wheel rotation operation of the operation device 20 by the passenger is equal to or higher than the third angle while the vehicle speed of the vehicle 1 is equal to or lower than the first speed.

The third angle is an angle greater than the second angle. The third angle is an angle equal to or smaller than the first angle described later. The third angle is, for example, 180 degrees in the steering wheel rotation operation, but is not limited to this angle.

As the taught path R1 is not registered in a case where the angle of the steering wheel rotation operation is equal to or greater than the third angle while the vehicle speed of the vehicle 1 is equal to or lower than the first speed during the teaching traveling, it is possible to suppress the traveling route R on which it is difficult to perform the following traveling during the autonomous traveling from being registered as the taught path R1.

In the present embodiment, the control unit 11 further executes the following processing in the autonomous traveling mode.

When the start instruction for the autonomous traveling mode is received by the operation of the operation device 20 by the passenger, the control unit 11 reads the taught path data 18A and the map data 18B from the storage device 18. Then, the control unit 11 starts the autonomous traveling along a taught path R2.

The control unit 11 determines whether or not the vehicle speed of the vehicle 1 has reached a second speed during the autonomous traveling. The control unit 11 acquires the vehicle speed of the vehicle 1 included in the sensor information received from the sensor device 14. Then, the control unit 11 determines whether or not the acquired vehicle speed of the vehicle 1 has become equal to or lower than the second speed. The vehicle speed becoming equal to or lower than the second speed means that the vehicle speed has become equal to or lower than the second speed from a vehicle speed exceeding the second speed.

The second speed is a predetermined speed, and it is sufficient if the second speed is stored in the storage device 18 in advance. As the second speed, it is sufficient if a speed equal to or lower than a general speed of the vehicle 1 at the time of approaching the vicinity of the turning point P3 or at the time of reaching the turning point P3 is determined in advance. The second speed is specifically a speed including 0 (zero), and may include a speed at which the vehicle 1 slightly travels. The speed at which the vehicle 1 slightly travels is a speed (for example, 6 km/h) at the time of a creep phenomenon, but is not limited to this speed. The second speed stored in the storage device 18 may be changeable as appropriate according to an operation instruction or the like for the operation device 20 from the passenger or the like. In addition, the second speed may be the same as or different from the first speed.

In response to determining that the vehicle speed of the vehicle 1 has become equal to or lower than the second speed during the autonomous traveling, the control unit 11 causes the movement control device 12 to perform steering at the first angle or greater.

The first angle is an example of a predetermined angle. The first angle is an angle greater than the third angle. Specifically, it is sufficient if the first angle is any angle as long as the first angle is an angle necessary for performing turning such that the vehicle 1 can travel along the taught path R1 by performing turning traveling that changes the orientation or direction of the vehicle 1 at the turning point P3 or in the vicinity of the turning point P3. Specifically, in one example, the first angle is 360 degrees in the steering wheel rotation steering, but is not limited to this angle.

In response to determining that the vehicle 1 has become equal to or lower than the second speed during the autonomous traveling, the control unit 11 additionally controls the taught path R1 such that steering wheel rotation of the first angle or greater is performed at a point where the determination has been performed. By the control, the control unit 11 causes the vehicle 1 to perform the turning traveling by steering at the first angle or greater at the point. Thus, the control unit 11 can control the movement control device 12 to add turning steering or stationary steering at the point.

Therefore, even in a case where the traveling route R on which the steering wheel rotation operation of the predetermined rotation angle or greater is performed has been registered as the taught path R1, it is possible to suppress difficulty in following traveling along the taught path R1 during the autonomous traveling by the control of the control unit 11.

In addition, the control unit 11 may change the taught path R1 so as to cause the movement control device 12 to perform steering at the predetermined angle or greater at the turning point included in the taught path R1 before or during the autonomous traveling. The predetermined angle is, for example, the first angle.

In this case, it is sufficient if the control unit 11 determines the turning point P3 included in the taught path R1 by a known method and changes the taught path R1 such that the steering wheel rotation operation of the first angle or greater is performed at the turning point P3.

Also in this case, even in a case where the traveling route R on which the steering wheel rotation operation of the predetermined rotation angle or greater is performed has been registered as the taught path R1, the control unit 11 can suppress difficulty in following traveling along the taught path R1 during the autonomous traveling.

Next, an example of a procedure of information processing executed by the control unit 11 of the vehicle control device 10 will be described.

FIG. 6 is a flowchart illustrating an example of a procedure of information processing executed by the control unit 11 in the teaching traveling mode.

The control unit 11 determines whether or not a signal indicating the start instruction for the teaching traveling mode has been received from the operation device 20 (step S100). When a negative determination is made in step S100 (step S100: No), this routine ends. When an affirmative determination is made in step S100 (step S100: Yes), the processing proceeds to step S102.

The control unit 11 sets a point where the signal indicating the start instruction for the teaching traveling mode has been received in step S100 as the predetermined position P1, and causes the display device 22 to display the third indicator M3 (step S102). By the processing of step S102, the third indicator screen 30A including the third indicator M3 illustrated in FIG. 3 is displayed on the display device 22.

When the manual operation of the vehicle 1 by the passenger starts the teaching traveling of the vehicle 1, the control unit 11 starts sequentially storing the map data 18B and the current positions of the vehicle 1 in the storage device 18 (step S104). Specifically, the control unit 11 sequentially stores the current positions of the vehicle 1 sequentially estimated during the teaching traveling of the vehicle 1. At this time, the control unit 11 assigns the INDEX to the current position, and sequentially stores the traveling position which is the current position, the azimuth, the traveling direction, and the reference traveling information while correlating with one another. In addition, the control unit 11 determines the feature points by performing image analysis on the captured video captured by the camera during the teaching traveling, and sequentially registers the feature points in the map data 18B.

Next, the control unit 11 determines whether or not the vehicle speed of the vehicle 1 has become equal to or lower than the first speed (step S106). When a negative determination is made in step S106 (step S106: No), the processing proceeds to step S118 described later. When an affirmative determination is made in step S106 (step S106: Yes), the processing proceeds to step S108.

In step S108, the control unit 11 applies the resistance force to the steering wheel rotation operation of the operation device 20 by the passenger (step S108). In one example, the control unit 11 applies the resistance force (reaction force) to the steering wheel included in the operation device 20 by a known technology to apply the resistance force to the steering wheel rotation operation.

In addition, the control unit 11 causes the display device 22 to display the first indicator M1 (step S110). By the processing of step S110, the first indicator screen 30B including the first indicator M1 illustrated in FIG. 4 is displayed on the display device 22.

Then, the control unit 11 determines whether or not the steering wheel rotation operation of the second angle or greater for the steering wheel included in the operation device 20 by the passenger has been received while the speed of the vehicle 1 is equal to or lower than the first speed (step S112). When a negative determination is made in step S112 (step S112: No), the processing proceeds to step S118 described later. When an affirmative determination is made in step S112 (step S112: Yes), the processing proceeds to step S114.

In step S114, the control unit 11 causes the display device 22 to display the fourth indicator M4 (step S114). By the processing of step S114, the fourth indicator screen 30C including the fourth indicator M4 illustrated in FIG. 5 is displayed on the display device 22.

Then, the control unit 11 determines whether or not the angle of the steering wheel rotation operation of the operation device 20 by the passenger is smaller than the third angle while the speed of the vehicle 1 is equal to or lower than the first speed (step S116). In response to determining in step S116 that the angle of the steering wheel rotation operation is equal to or greater than the third angle (step S116: No), this routine ends.

In response to determining in step S116 that the angle of the steering wheel rotation operation is smaller than the third angle (step S116: Yes), the processing proceeds to step S118.

In step S118, the control unit 11 determines whether or not the end instruction for the teaching traveling mode has been received (step S118). The control unit 11 performs the determination of step S118 by determining whether or not a signal indicating the end instruction has been received from the operation device 20 operated by the passenger. When a negative determination is made in step S118 (step S118: No), the control unit 11 returns to step S104. When an affirmative determination is made in step S118 (step S118: Yes), the control unit 11 proceeds to step S120.

In step S120, the control unit 11 stores the taught path data 18A and the map data 18B in the storage device 18 (step S120). The control unit 11 sets, as the taught path R1, the traveling route R during the teaching traveling represented by the group of the current positions sequentially stored by the processing of step S104, and stores the taught path data 18A representing the taught path R1 in the storage device 18. In addition, the control unit 11 stores the map data 18B in which the feature points determined by the processing of step S104 are registered in the storage device 18. Then, this routine ends.

Figure 7:
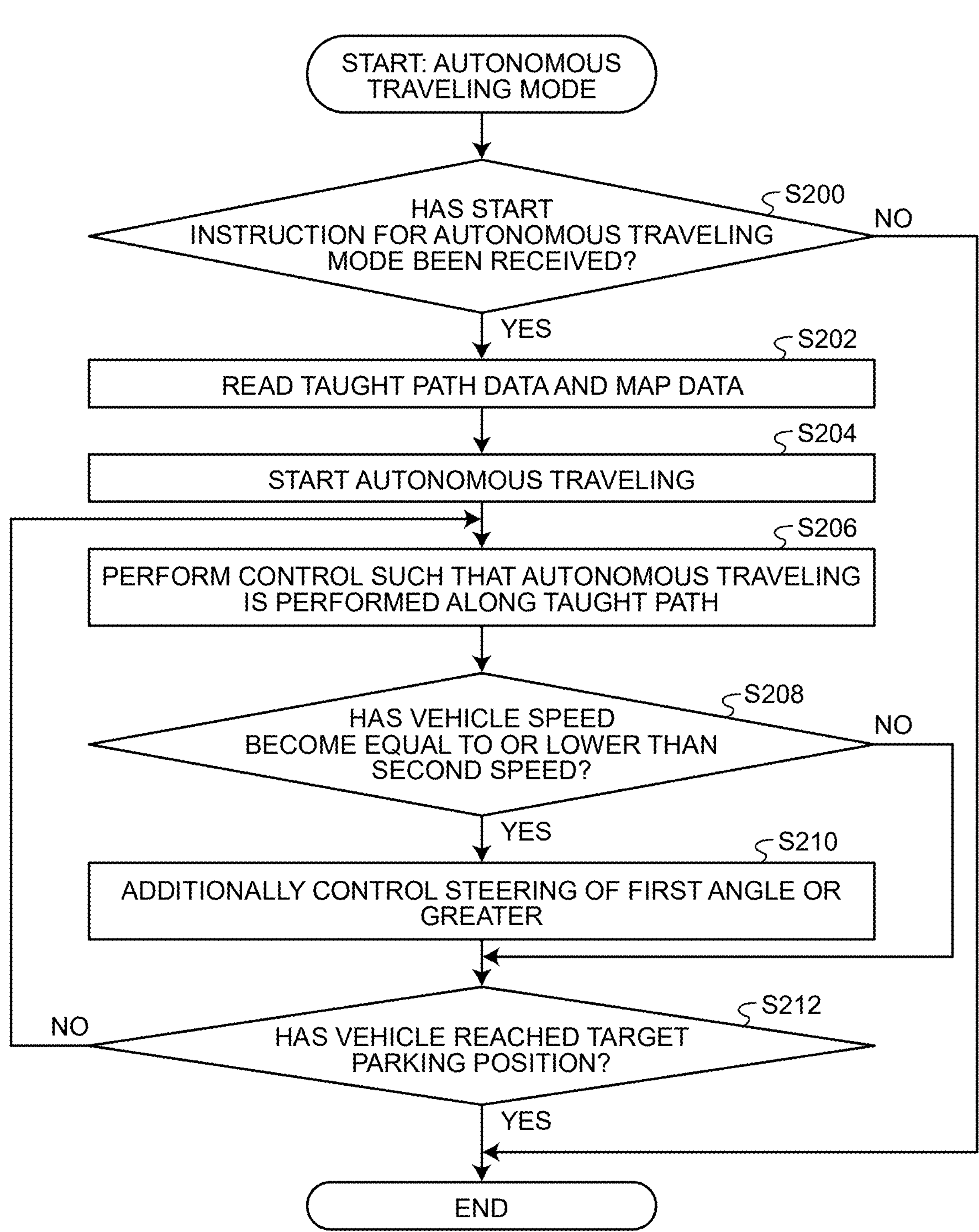
FIG. 7 is a flowchart illustrating an example of a procedure of information processing executed by the control unit in an autonomous traveling mode.

FIG. 7 is a flowchart illustrating an example of a procedure of information processing executed by the control unit 11 in the autonomous traveling mode.

The control unit 11 determines whether or not a signal indicating the start instruction for the autonomous traveling mode has been received from the operation device 20 (step S200). When a negative determination is made in step S200 (step S200: No), this routine ends. When an affirmative determination is made in step S200 (step S200: Yes), the processing proceeds to step S202.

In step S202, the control unit 11 reads the taught path data 18A and the map data 18B from the storage device 18 (step S202). Then, the control unit 11 starts the autonomous traveling along the taught path R1 represented by the taught path data 18A (step S204).

The control unit 11 controls the movement control device 12 to perform the autonomous traveling along the taught path R1 represented by the taught path data 18A read in step S202 (step S206). Specifically, the control unit 11 causes the vehicle 1 to perform the autonomous traveling from the predetermined position P1 toward the target parking position P2 along the taught path R1 by controlling the movement control device 12 such that the current position of the vehicle 1 included in the sensor information acquired from the sensor device 14 is a position on the taught path R1 represented by the taught path data 18A.

The control unit 11 determines whether or not the vehicle speed of the vehicle 1 has reached the second speed during the autonomous traveling (step S208). When a negative determination is made in step S208 (step S208: No), the processing proceeds to step S212 described later. When an affirmative determination is made in step S208 (step S208: Yes), the processing proceeds to step S210.

In step S210, the movement control device 12 is caused to perform steering at the first angle or greater (step S210). By the processing of step S210, the control unit 11 can additionally control the taught path R1 such that the steering wheel rotation steering at the first angle or greater is performed at a point of the vehicle 1 where the affirmative determination has been made in step S208. Thus, the control unit 11 can control the movement control device 12 to add turning steering or stationary steering at the point.

Next, the control unit 11 determines whether or not the vehicle 1 has reached the target parking position P2 (step S212). When a negative determination is made in step S212 (step S212: No), the processing returns to step S206. When an affirmative determination is made in step S212 (step S212: Yes), this routine ends.

As described above, the vehicle control device 10 according to the present embodiment is provided in the vehicle 1. The vehicle 1 includes the operation device 20 serving to receive the operation of the passenger, the sensor device 14 serving to acquire the outside situation, the display device 22 that is visually recognizable by the passenger, and the movement control device 12 serving to control at least the steering. The vehicle control device 10 registers the taught path R1 based on the outside situation acquired by the sensor device 14 during the teaching traveling in which the vehicle 1 travels from the predetermined position P1 to the target parking position P2 by the operation of the passenger. The vehicle control device 10 causes the vehicle 1 to perform the autonomous traveling by controlling at least the steering from the predetermined position P1 to the target parking position P2 based on the outside situation acquired by the sensor device 14 and the taught path R1. When the speed of the vehicle 1 has become equal to or lower than the first speed during the teaching traveling, the vehicle control device 10 applies the resistance force to the steering wheel rotation operation of the operation device 20 by the passenger, and causes the display device 22 to display the first indicator showing a request for suppression of the steering wheel rotation operation. When the speed of the vehicle 1 has become equal to or lower than the second speed during the autonomous traveling, the vehicle control device 10 causes the movement control device 12 to perform steering at the predetermined angle or greater.

In the related art, when the taught path R1 on which the steering wheel rotation operation of the predetermined rotation angle or greater is performed by the manual operation by the passenger during the teaching traveling is registered, it may be difficult to perform following traveling along the taught path R1 during the autonomous traveling. In the related art, it may be difficult to provide preferable parking assistance.

On the other hand, in a case where the vehicle speed of the vehicle 1 has become equal to or lower than the first speed during the teaching traveling, the vehicle control device 10 according to the present embodiment applies the resistance force to the steering wheel rotation operation of the operation device 20 by the passenger, and causes the display device 22 to display the first indicator showing a request for suppression of the steering wheel rotation operation. In addition, in a case where the speed of the vehicle 1 has become equal to or lower than the second speed during the autonomous traveling, the vehicle control device 10 causes the movement control device 12 to perform steering at the predetermined angle or greater.

Therefore, the vehicle control device 10 according to the present embodiment can suppress the taught path R1 on which it is difficult to perform following traveling during the autonomous traveling from being registered during the teaching traveling. In addition, the vehicle control device 10 according to the present embodiment can suppress difficulty in following traveling along the taught path R1 during the autonomous traveling.

Therefore, the vehicle control device 10 according to the present embodiment can provide more preferable parking assistance.

Next, a hardware configuration of the vehicle control device 10 according to the present embodiment will be described.

Figure 8:
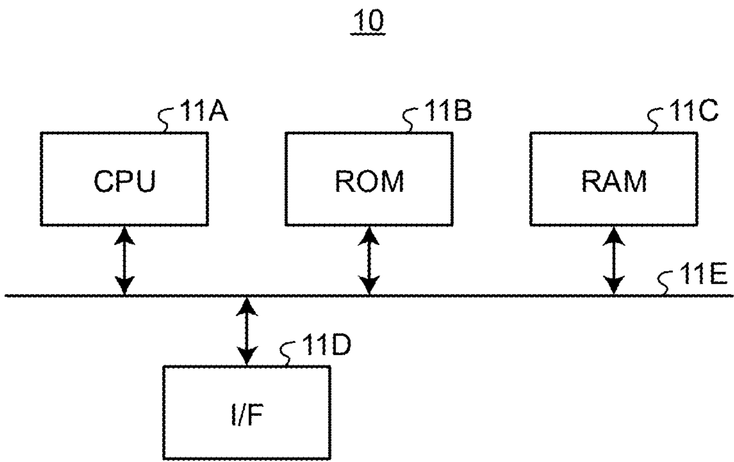
FIG. 8 is a block diagram illustrating a hardware configuration example of a vehicle control device.

FIG. 8 is a block diagram illustrating a hardware configuration example of the vehicle control device 10.

The vehicle control device 10 has a hardware configuration using a normal computer in which a central processing unit (CPU) 11A, a read only memory (ROM) 11B, a random access memory (RAM) 11C, an interface (I/F) 11D for connecting to various devices, and the like are connected to one another by a bus 11E.

The CPU 11A is an arithmetic device that controls the entire processing of the vehicle control device 10. The RAM 11C stores data necessary for various types of processing executed by the CPU 11A. The ROM 11B stores a computer program or the like that implements various types of processing executed by the CPU 11A. The I/F 11D is an interface that is connected to an external device or an external terminal via a communication line or the like and transmits and receives data to and from the connected external device or external terminal.

A computer program for executing the above-described various types of processing executed by the vehicle control device 10 is provided by being incorporated in the ROM 11B or the like in advance. A computer program for executing the vehicle control method executed in the present embodiment may be provided by being recorded in a computer-readable recording medium such as a CD-ROM, a flexible disk (FD), a CD-R, or a digital versatile disc (DVD) as a file in a format installable or executable in these devices.

In addition, the program for executing the vehicle control method executed in the present embodiment may be stored on a computer connected to a network such as the Internet and provided by being downloaded via the network. In addition, the program for executing the vehicle control method executed in the present embodiment may be provided or distributed via a network such as the Internet.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A vehicle control method executed by a vehicle control device provided in a vehicle, the vehicle including an operation device serving to receive an operation of a passenger, a sensor device serving to acquire an outside situation, a display device being visually recognizable by the passenger, and a movement control device serving to control at least steering, the vehicle control method comprising:

registering a taught path based on an outside situation acquired by the sensor device during teaching traveling in which the vehicle travels from a predetermined position to a target parking position by the operation of the passenger;

causing, based on the outside situation acquired by the sensor device and the taught path, the vehicle to perform autonomous traveling from the predetermined position to the target parking position by controlling at least the steering;

when a speed of the vehicle has become equal to or lower than a first speed during the teaching traveling, applying a resistance force to a steering wheel rotation operation of the operation device by the passenger and causing the display device to display a first indicator showing a request for suppression of the steering wheel rotation operation; and, when the speed of the vehicle has become equal to or lower than a second speed during the autonomous traveling, causing the movement control device to perform steering at a predetermined angle or greater.

2. The vehicle control method according to claim 1, wherein the first speed includes zero.

3. The vehicle control method according to claim 1, wherein the second speed includes zero.

4. The vehicle control method according to claim 1, wherein the predetermined angle is 360 degrees in the steering wheel rotation operation.

5. The vehicle control method according to claim 1, wherein the first indicator includes a second indicator showing prohibition of the steering wheel rotation operation.

6. The vehicle control method according to claim 1, further comprising, when the vehicle is at the predetermined position in the teaching traveling, causing the display device to display a third indicator showing a request to refrain from a stationary steering operation.

7. The vehicle control method according to claim 1, further comprising:

setting the predetermined angle to a first angle;

when the speed of the vehicle has become equal to or lower than the first speed during the teaching traveling, applying the resistance force to the steering wheel rotation operation of the operation device by the passenger and causing the display device to display the first indicator showing the request for suppression of the steering wheel rotation operation; and, in response to receiving the steering wheel rotation operation at a second angle or greater for the operation device by the passenger while the speed of the vehicle is equal to or lower than the first speed, causing the display device to display a fourth indicator showing a possibility that the taught path is not registerable.

8. The vehicle control method according to claim 7, further comprising:

registering the taught path when an angle of the steering wheel rotation operation of the operation device by the passenger is smaller than a third angle being greater than the second angle while the speed of the vehicle is equal to or lower than the first speed; and registering no taught path when the angle of the steering wheel rotation operation of the operation device by the passenger is equal to or greater than the third angle while the speed of the vehicle is equal to or lower than the first speed.

9. The vehicle control method according to claim 8, wherein the first angle is greater than the third angle.

10. The vehicle control method according to claim 1, further comprising changing the taught path to cause the movement control device to perform steering at the predetermined angle or greater at a turning point included in the taught path before or during the autonomous traveling.

11. A vehicle control device to be provided in a vehicle, the vehicle including an operation device serving to receive an operation of a passenger, a sensor device serving to acquire an outside situation, a display device being visually recognizable by the passenger, and a movement control device serving to control at least steering, the vehicle control device comprising:

a hardware processor coupled to a memory and configured to:

register a taught path based on an outside situation acquired by the sensor device during teaching traveling in which the vehicle travels from a predetermined position to a target parking position by the operation of the passenger;

cause, based on the outside situation acquired by the sensor device and the taught path, the vehicle to perform autonomous traveling from the predetermined position to the target parking position by controlling at least the steering;

when a speed of the vehicle has become equal to or lower than a first speed during the teaching traveling, apply a resistance force to a steering wheel rotation operation of the operation device by the passenger and cause the display device to display a first indicator showing a request for suppression of the steering wheel rotation operation; and, when the speed of the vehicle has become equal to or lower than a second speed during the autonomous traveling, cause the movement control device to perform steering at a predetermined angle or greater.

12. The vehicle control device according to claim 11, wherein the first speed includes zero.

13. The vehicle control device according to claim 11, wherein the second speed includes zero.

14. The vehicle control device according to claim 11, wherein the predetermined angle is 360 degrees in the steering wheel rotation operation.

15. The vehicle control device according to claim 11, wherein the first indicator includes a second indicator showing prohibition of the steering wheel rotation operation.

16. The vehicle control device according to claim 11, wherein the hardware processor is configured to, when the vehicle is at the predetermined position in the teaching traveling, cause the display device to display a third indicator showing a request to refrain from a stationary steering operation.

17. The vehicle control device according to claim 11, wherein the hardware processor is configured to:

set the predetermined angle to a first angle;

when the speed of the vehicle has become equal to or lower than the first speed during the teaching traveling, apply the resistance force to the steering wheel rotation operation of the operation device by the passenger and cause the display device to display the first indicator showing the request for suppression of the steering wheel rotation operation; and, in response to receiving the steering wheel rotation operation at a second angle or greater for the operation device by the passenger while the speed of the vehicle is equal to or lower than the first speed, cause the display device to display a fourth indicator showing a possibility that the taught path is not registerable.

18. The vehicle control device according to claim 17, wherein the hardware processor is configured to:

register the taught path when an angle of the steering wheel rotation operation of the operation device by the passenger is smaller than a third angle being greater than the second angle while the speed of the vehicle is equal to or lower than the first speed; and register no taught path when the angle of the steering wheel rotation operation of the operation device by the passenger is equal to or greater than the third angle while the speed of the vehicle is equal to or lower than the first speed.

19. The vehicle control device according to claim 18, wherein the first angle is greater than the third angle.

20. The vehicle control device according to claim 11, wherein the hardware processor is configured to change the taught path to cause the movement control device to perform steering at the predetermined angle or greater at a turning point included in the taught path before or during the autonomous traveling.

* * * * *